No. 792,868. Patented June 20, 1905.

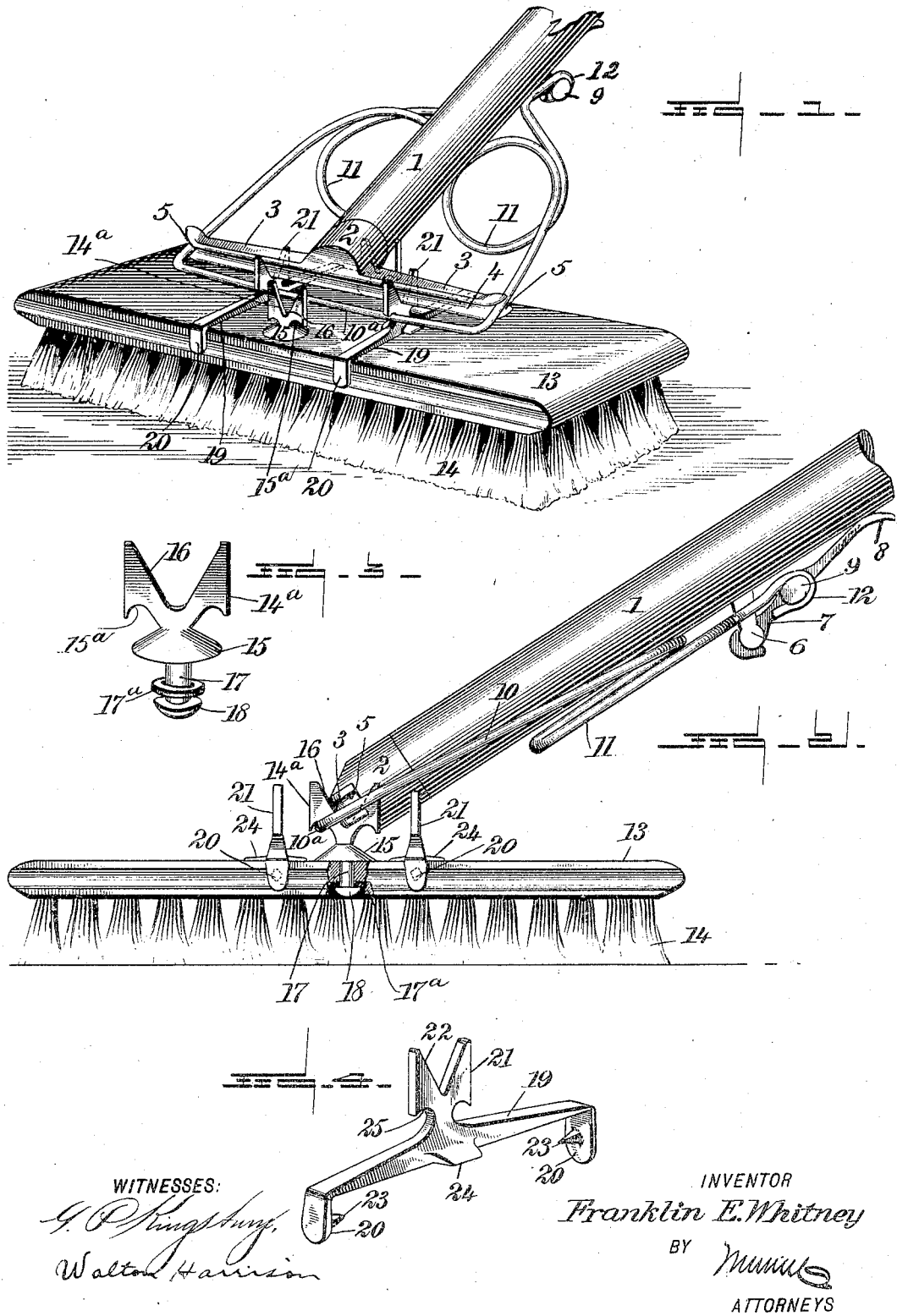

UNITED STATES PATENT OFFICE.

FRANKLIN EBENEZER WHITNEY, OF SYRACUSE, NEW YORK.

SCRUBBING DEVICE.

SPECIFICATION forming part of Letters Patent No. 792,868, dated June 20, 1905.

Application filed January 20, 1904. Serial No. 189,803.

*To all whom it may concern:*

Be it known that I, FRANKLIN EBENEZER WHITNEY, a citizen of the United States, and a resident of Syracuse, in the county of Onondaga and State of New York, have invented a new and Improved Scrubbing Device, of which the following is a full, clear, and exact description.

My invention relates to scrubbing-brushes, mops, and the like, my more particular object being to produce a strong, durable, cheap, and simple brush which can be readily manipulated by any person of ordinary intelligence and which possesses certain peculiar advantages hereinafter described, and pointed out in the appended claims.

Reference is to be had to the accompanying drawings, forming a part of this specification, in which similar characters of reference indicate corresponding parts in all the figures.

Figure 1 is a fragmentary perspective view showing my invention with the handle in one of its positions. Fig. 2 is a fragmentary side elevation, partly broken away and showing the handle in another of its positions. Fig. 3 is a perspective view of one of the fastening members, and Fig. 4 is a perspective view of another one of the fastening members.

The handle is shown at 1 and is provided with a metallic head 2, this metallic head being provided with arms 3, preferably integral therewith, as shown more particularly in Fig. 1. Each of these arms 3 is provided with a concave face 4 and with channels 5 at its ends. Rigidly mounted upon the handle 1 is a stem 6, and upon this stem is mounted a lever 7, provided with a handle 8 and with trunnions 9. A single section 10, of spring metal, is provided with loops 11 and with hooks 12, these hooks partially encircling the trunnions 9. A portion $10^a$ of the section of spring metal is straight, as indicated in Figs. 1 and 2. When the handle 8 is moved downwardly below the handle 1, the tension of the spring-section 10 and of the loops 11 is relaxed, so that in order to allow the portion $10^a$ of spring metal to recede from the channel 4 all that is necessary is to move the lever-handle 8 radially downward from the mop-handle 1.

The brush is shown at 13 and is provided with the usual bristles 14. Mounted upon the brush are two brackets $14^a$, each provided with a base portion 15, downwardly-disposed notches $15^a$, and a V-shaped recess 16. Each of these brackets is further provided with a stem 17, which passes through the woodwork of the brush and is headed at 18, so as to hold the member upon the woodwork, as indicated in Fig. 2, a washer $17^a$ being placed loosely upon the stem 17 before the same is headed. A pair of brackets 19, each provided with downwardly-turned ends 20, are mounted so as to cross the brush-back, as indicated in Fig. 1. Integrally connected with each of these brackets is a Y-shaped member 21, provided with a V-shaped aperture 22, this recess being somewhat similar to the recess 16 in the supports $14^a$ (shown in Fig. 3) and is also provided with notches 25. (See Fig. 4.)

Each of the downwardly-projecting portions 20 is provided with a sharp tooth 23, which may be driven into the woodwork of the brush. Supporting-lugs 24 are provided for the purpose of bracing the members 21, as indicated in Figs. 2 and 4.

My invention is used as follows: The lever-handle 8 is pushed downwardly and away from the mop-handle 1, as above described. The arms 3 are inserted within the V-shaped recesses 16 or the V-shaped recesses 22, as the case may be, and the portion $10^a$, of spring metal, is placed in the notches $15^a$ or 25 before restoring the lever-handle 8 to its position indicated in Figs. 1 and 2. Then the lever-handle 8 is pressed back against the mop-handle 1, bringing a considerable strain to bear upon the spring member $10^a$, whereby the latter is held securely in the notches 25, and by its elasticity holds the arms 3 3 firmly in the recesses 22 or 16.

It will be noted that the general conformity of each arm 3 3 is such as to make a good bearing within the recesses 16 or 22, and when the pressure of the spring is brought to bear upon these arms they will be secured in position within the V-shaped recesses 16 or 22 and prevent the brush from moving to any great extent relatively to the mop-handle 1.

It will also be noted from Fig. 2 that when the arms 3 3 are in the V-shaped recesses 16 one of the Y-shaped members 21 serves as a brace or support for the mop-handle 1—that is to say, the recess 22 of one of the members 21, located upon a bracket 19, fits snugly against the under side of the mop-handle 1 and acts as a brace therefor.

Having thus described my invention, I claim as new and desire to secure by Letters Patent—

1. A scrubbing-brush, comprising a brush member, spaced brackets mounted on the brush member and each provided with a V-shaped recess in its top and with notches in its opposing edges, a handle provided with a transversely-disposed member adapted to fit in the said recesses, and means on the handle for engaging the notches on either side of the brackets.

2. A scrubbing-brush, comprising a brush having pairs of brackets arranged at right angles to each other, said brackets being each provided with a V-shaped recess in its top and notches in opposing sides, and a handle provided with a transverse member for engaging the recesses of a pair of brackets, and a clamping device for engaging the notches in either side of said pairs of brackets to hold the handle thereto and in engagement with a bracket of the other pair of brackets.

3. In a scrubbing device, the combination with a brush having thereon two pairs of brackets provided with V-shaped recesses, said two pairs of brackets being arranged at right angles to each other, of a handle provided with a member adapted for engagement with the recesses in one pair of said brackets, and means for securing said member in said recesses and holding the handle adjacent to said member in the recess of one of the brackets of the other pair.

4. The combination with a brush having two pairs of brackets, the pairs of brackets being arranged at right angles to each other, of a handle provided with a member for engaging a pair of brackets, and means for clamping the said member to the brackets with the handle in engagement with a bracket of the other pair of brackets.

In testimony whereof I have signed my name to this specification in the presence of two subscribing witnesses.

FRANKLIN EBENEZER WHITNEY.

Witnesses:
L. A. NICHOLS,
W. L. SCHULTZ.